(12) United States Patent
Luehrsen et al.

(10) Patent No.: US 9,599,014 B2
(45) Date of Patent: Mar. 21, 2017

(54) WASTEGATE CONTROL USING NON-HARMONIC OSCILLATIONS

(71) Applicant: Ford Global Technologies, LLC, Dearborn, MI (US)

(72) Inventors: Eric Luehrsen, Dearborn, MI (US); Yan Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 297 days.

(21) Appl. No.: 14/286,702

(22) Filed: May 23, 2014

(65) Prior Publication Data
US 2015/0337719 A1 Nov. 26, 2015

(51) Int. Cl.
F02B 37/18 (2006.01)
F02D 23/00 (2006.01)
F02D 41/00 (2006.01)

(52) U.S. Cl.
CPC ............ F02B 37/186 (2013.01); F02D 23/00 (2013.01); F02D 41/0007 (2013.01); F02B 37/18 (2013.01); Y02T 10/144 (2013.01)

(58) Field of Classification Search
CPC .................................................. F02B 37/186
See application file for complete search history.

(56) References Cited

U.S. PATENT DOCUMENTS

| | | | |
|---|---|---|---|
| 3,446,473 A | 5/1969 | Barker | |
| 4,387,571 A * | 6/1983 | Katsumata | F02B 37/186 60/602 |
| 5,058,537 A | 10/1991 | Paul et al. | |
| 6,147,831 A | 11/2000 | Kennedy et al. | |
| 6,614,613 B1 | 9/2003 | Huang et al. | |
| 7,434,397 B2 | 10/2008 | Hasegawa | |
| 7,562,527 B2 | 7/2009 | Eiraku | |
| 7,775,043 B2 | 8/2010 | Funke et al. | |
| 7,900,869 B2 * | 3/2011 | Keβler | B64C 27/001 244/17.13 |
| 8,051,644 B2 | 11/2011 | Gonze et al. | |
| 2007/0289302 A1 | 12/2007 | Funke et al. | |
| 2010/0011764 A1 | 1/2010 | Andrews | |
| 2010/0321027 A1* | 12/2010 | Khater et al. | G01N 27/61 324/452 |
| 2012/0001111 A1 | 1/2012 | Takeda et al. | |

(Continued)

FOREIGN PATENT DOCUMENTS

EP 2107225 A1 10/2009

OTHER PUBLICATIONS

Li, Yunfeng et al., "Track-Following Control with Active Vibration Damping of a PZT-Actuated Suspension Dual-Stage Servo System," Institute of Electrical and Electronics Engineers, Proceedings of the American Control Conference, Denver, Co., Jun. 4-6, 2003, 18 pages.

(Continued)

Primary Examiner — Mary A Davis
(74) Attorney, Agent, or Firm — Julia Voutyras; John D. Russell; B. Anna McCoy (57) ABSTRACT

Various methods for operating a wastegate are provided. In one example, a method of adjusting a linked valve actuator system comprises applying, in addition to feedback position control adjustments, a non-harmonic oscillation to an actuator of the linked valve actuator system.

18 Claims, 6 Drawing Sheets (56) References Cited

U.S. PATENT DOCUMENTS

2012/0232770 A1* 9/2012 Breitbach .............. F02B 39/16
  701/102
2013/0189072 A1 7/2013 Wade

OTHER PUBLICATIONS

Kokotovic, Vladimir V. et al., "Electric Waste Gate Control System Sensor Calibration with End-Stop Detection," U.S. Appl. No. 13/896,257, filed May 16, 2013, 33 pages.
Wang, Yan et al., "Determination of Wastegate Valve Position," U.S. Appl. No. 14/014,156, filed Aug. 29, 2013, 48 pages.
Wang, Yan et al., "Wastegate Valve Seat Position Determinations," U.S. Appl. No. 14/189,836, filed Feb. 25, 2014, 44 pages.

* cited by examiner

WASTEGATE CONTROL USING NON-HARMONIC OSCILLATIONS

FIELD

The field of the disclosure relates to control of a wastegate in a turbocharger.

BACKGROUND AND SUMMARY

Some internal combustion engines utilize a compression device such as a turbocharger to increase engine torque/power output density. In one example, a turbocharger may include a compressor and a turbine connected by a drive shaft, where the turbine is coupled to an exhaust manifold side of an engine and the compressor is coupled to an intake manifold side of the engine. In this way, the exhaust-driven turbine supplies energy to the compressor to increase the pressure (e.g. boost, or boost pressure) in the intake manifold and to increase the flow of air into the engine. The boost may be controlled by adjusting the amount of gas reaching the turbine, for example with a wastegate. An actuator may be operatively coupled via a linkage to a wastegate valve and driven to position the wastegate valve anywhere between a fully open position and a fully closed position (e.g., at a valve seat) to achieve the desired boost based on operating conditions. The actuator may be an electric actuator such as an electric motor, for example.

The turbocharger may be consistently exposed to high surrounding temperatures, for example due to proximate flow of hot exhaust gas. As such, a relatively long linkage may be employed to couple the wastegate valve to its associated actuator and reduce the proximity of the actuator to high temperatures to thereby protect the actuator from potential degradation arising from such high temperatures. Linkages of this type, however, may exhibit noise, vibration, and harshness (NVH) such as rattle during certain conditions—for example, during times at which the linkage remains relatively stationary or when an associated engine is idle. More generally, these issues may arise in control devices that employ servomechanisms to control relatively long linkages.

In some approaches to reducing NVH in a wastegate actuator, the wastegate valve is forced shut during certain operating conditions (e.g., during engine idle). In other approaches, a bias spring and/or other mechanical components (e.g., dampers) are coupled to the wastegate assembly at a location where vibration may be absorbed.

The inventors herein have recognized several issues with the approaches identified above. While NVH may be reduced for the approaches in which the wastegate valve is forced shut during certain operating conditions, the emissions and fuel economy exhibited by an engine employing such control may be adversely affected by back pressure generated by valve closure. In contrast, addition of a bias spring may increase the load imposed on the wastegate actuator, which may reduce the quality of boost control and increase the risk of actuator degradation due to high actuator temperatures caused by increased current levels drawn to overcome the increased load. Further, the addition of other mechanical components introduces added cost and potential points of failure, especially in locations where excessive heat is present.

Methods for operating a wastegate are thus provided. In one example, a method of adjusting a linked valve actuator system comprises applying, in addition to feedback position control adjustments, a non-harmonic oscillation to an actuator of the linked valve actuator system.

In a more specific example, the non-harmonic oscillation is applied for a subset of wastegate valve lifts proximate, but not corresponding to, a valve seat of the linked valve actuator system.

In another aspect of the example, the non-harmonic oscillation is asinusoidal.

In yet another aspect of the example, the non-harmonic oscillation is periodic and has an overlay frequency determined based on a rattle frequency.

In still another aspect of the example, the rattle frequency is a period between successive times at which a wastegate valve of the linked valve actuator system makes contact with a valve seat of the linked valve actuator system.

In still further another aspect of the example, the overlay frequency is further determined based on a constant multiplied by the rattle frequency, the constant being an approximate ratio of Fibonacci numbers.

In the examples described above, NVH in a wastegate assembly may be reduced without forcing the wastegate valve closed and adversely affecting emissions and fuel economy. Moreover, the increased cost, actuator load, packaging space, and potential degradation associated with added parts may be obviated. In contrast to the addition of mechanical parts, the wastegate control routines of a vehicle may be easily augmented with the approaches described herein at any point of the vehicle lifetime, for example by updating instructions held in an engine controller. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Servomechanisms that employ complex or long linkages to position an element such as a valve are often prone to rattle when the element remains relatively static but a proximate mechanical component is undergoing motion. One such servomechanism may be a wastegate actuator that employs a relatively long linkage coupling an output shaft of the actuator to a wastegate valve to position the valve to control the amount of boost delivered to an internal combustion engine. During times in which the engine is idle and the wastegate valve is not being repositioned, the linkage may rattle. In some approaches, the wastegate valve is placed at a fully closed position against a valve seat to avoid rattle. This may generate back pressure which can adversely affect emissions and fuel economy, however. In other approaches, a bias spring is added to the wastegate valve actuation system to prevent rattle. This addition, however, increases the load on the wastegate actuator. Other mechanical components (e.g., dampers) may be added to reduce rattle, but introduce durability and consistency issues due to their proximity to high surrounding temperatures.

Figure 1:
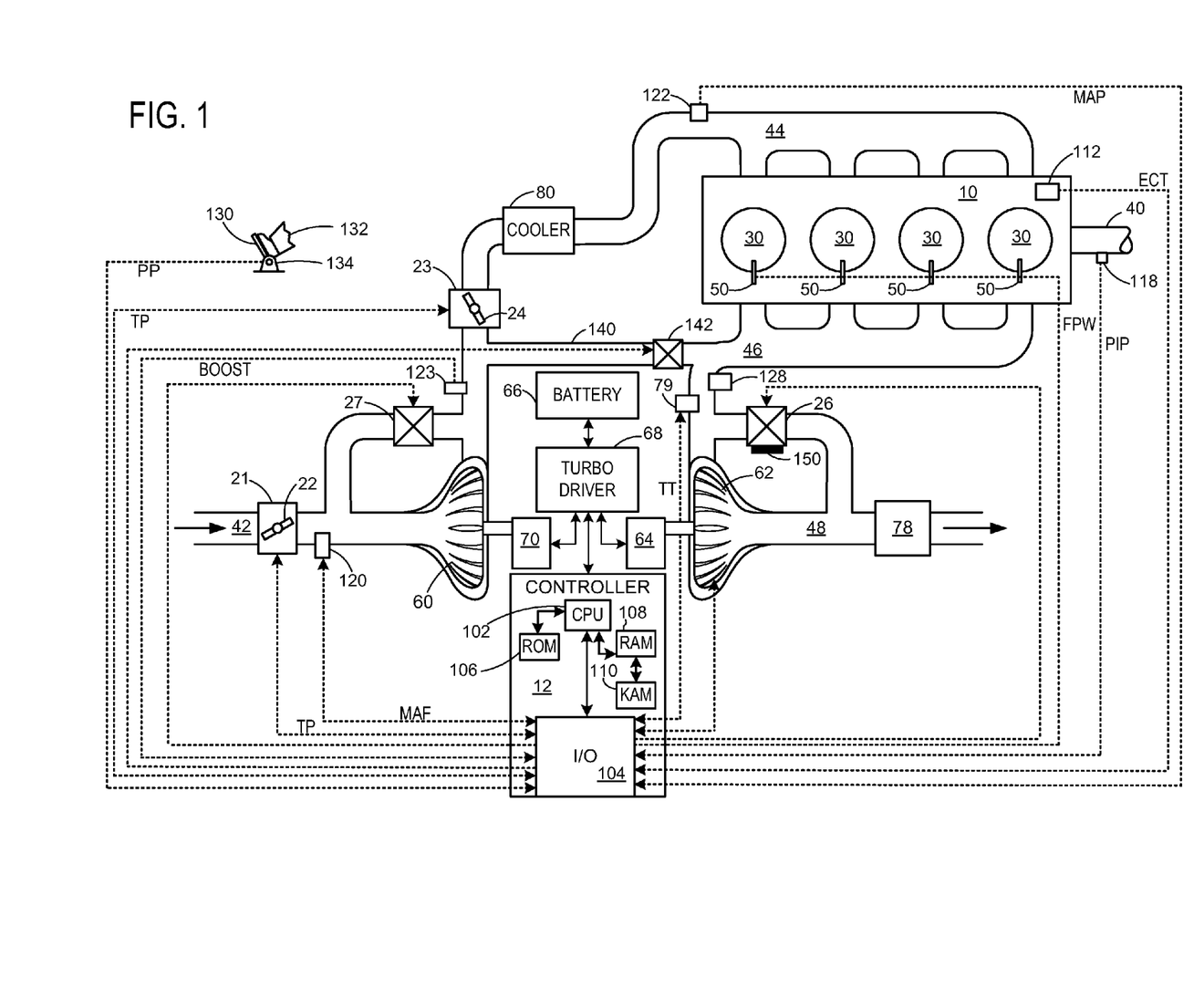
FIG. 1 shows a block diagram of a turbocharged engine including a wastegate.
Figure 2:
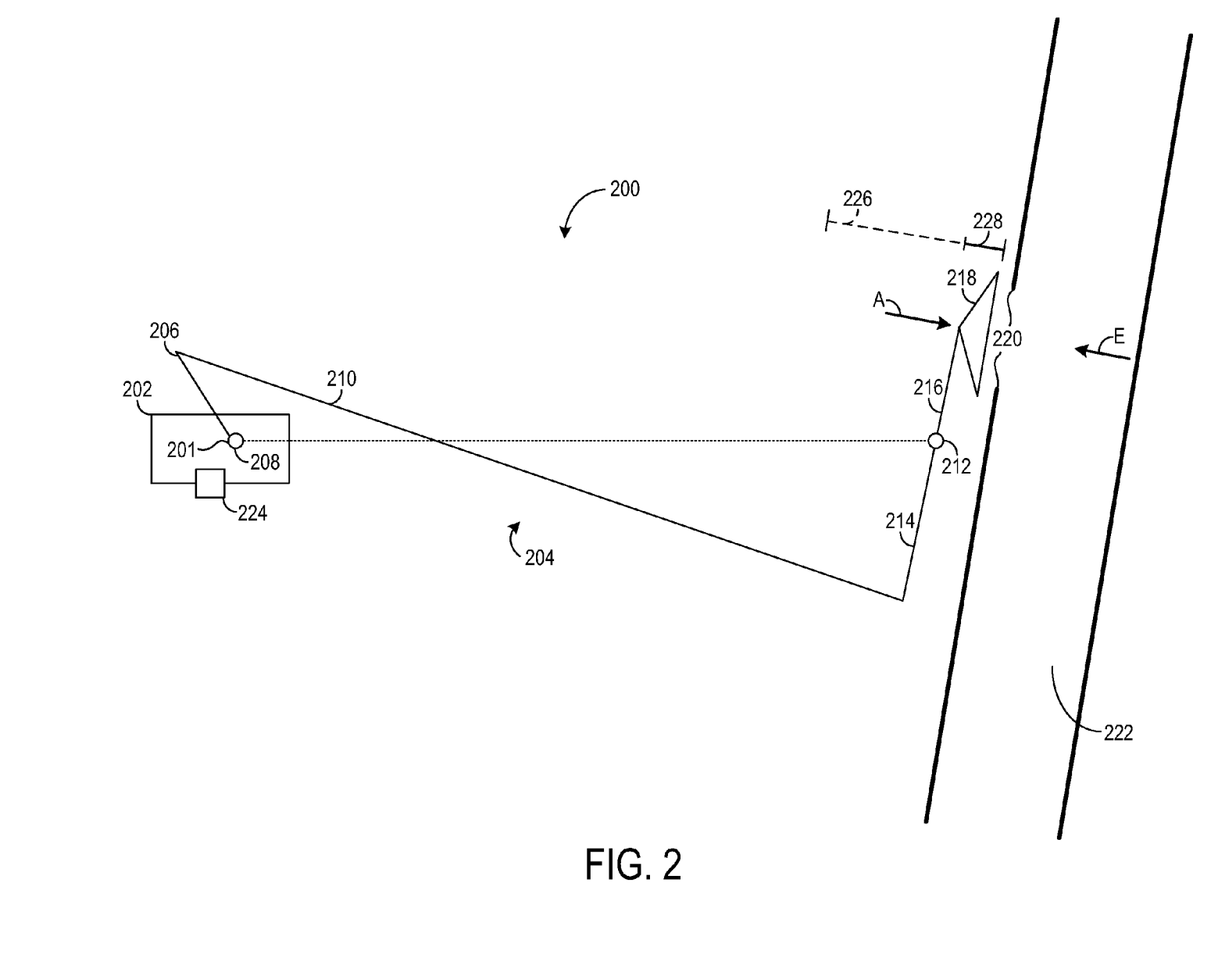
FIG. 2 shows an exemplary arrangement of the wastegate of FIG. 1.
Figure 3:
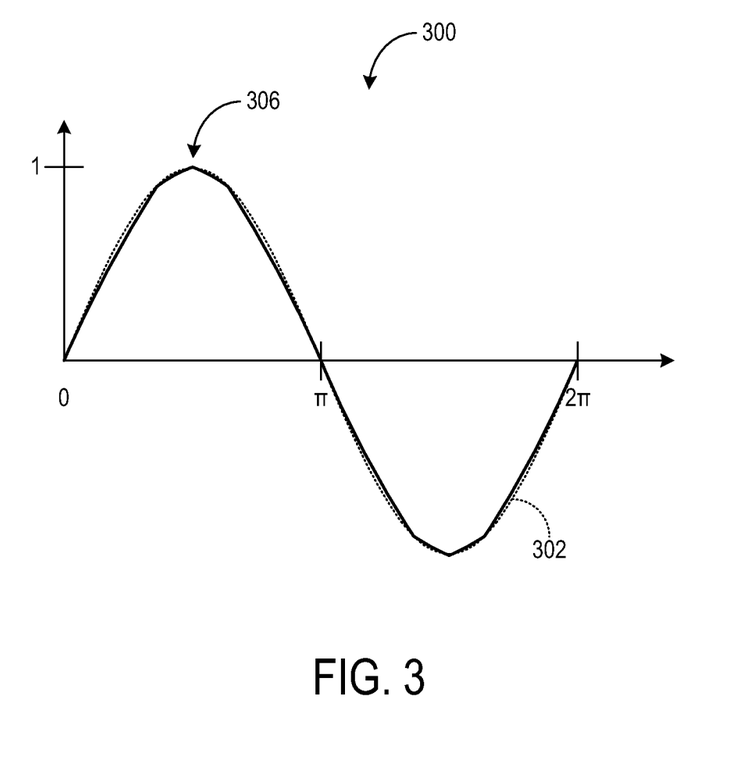
FIG. 3 shows an example waveform that may be overlaid on control signals sent to a wastegate actuator of the wastegate arrangement of FIG. 2.
Figure 4A:
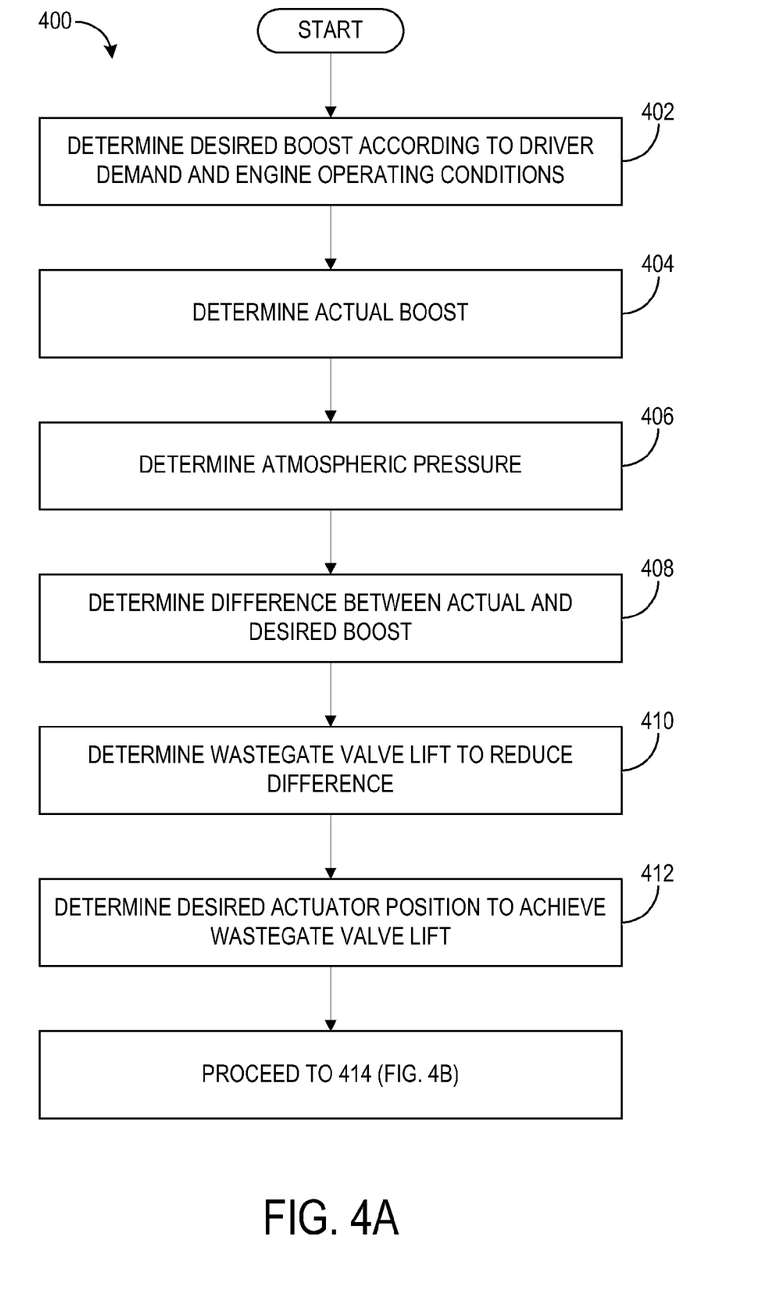
FIGS. 4A-B show a flowchart illustrating a method of operating a wastegate.
Figure 4B:
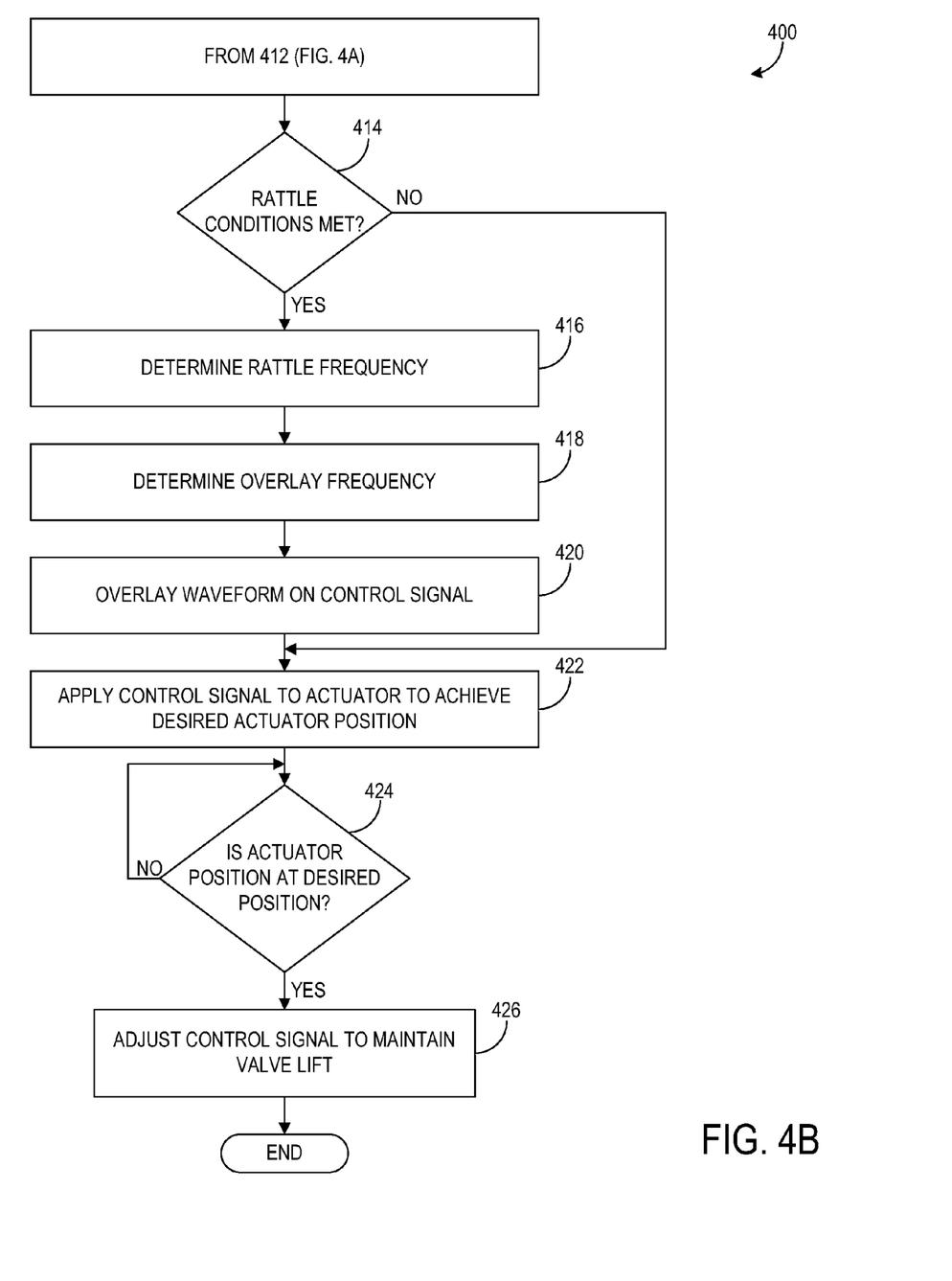
Figure 5:
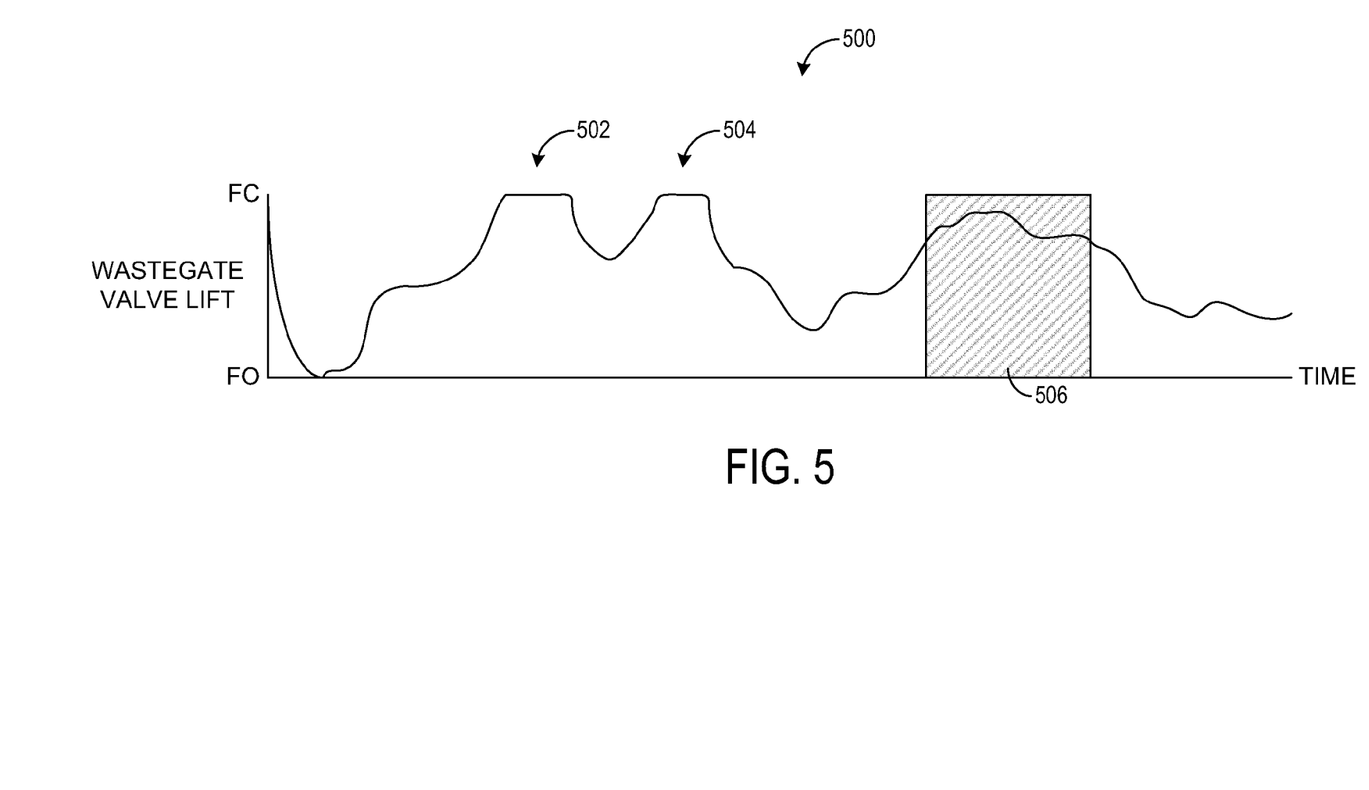
FIG. 5 shows an exemplary map illustrating wastegate valve lift for an exemplary drive cycle.

Various methods for operating a wastegate are thus provided. FIG. 1 shows a block diagram of a turbocharged engine including a wastegate, FIG. 2 shows an exemplary arrangement of the wastegate of FIG. 1, FIG. 3 shows an example waveform that may be overlaid on control signals sent to a wastegate actuator of the wastegate arrangement of FIG. 2, FIGS. 4A-B show a flowchart illustrating a method of operating a wastegate, and FIG. 5 shows an exemplary map illustrating wastegate valve lift for an exemplary drive cycle. The engine of FIG. 1 also includes a controller configured to carry out the method depicted in FIGS. 4A-B.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric actuator such as an electric motor, for example, though pneumatic actuators are also contemplated. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning now to FIG. 2, an exemplary wastegate arrangement 200 is shown. Wastegate 200 may be wastegate 26 in FIG. 1, for example. Wastegate 200 is operated by an actuator 202, which may be actuator 150 in FIG. 1. In this example, actuator 202 is an electric actuator such as an electric motor. In some examples, actuator 202 may particularly be a rotary actuator having an element that undergoes rotation to thereby alter the actuator position. An output shaft 201 of actuator 202 is coupled to a linkage 204 and in particular a first link 206 of the linkage. As shown, linkage 204 in the illustrated embodiment is a four-bar, though other linkages are possible such as a linear rod. Linkage 204 moves about two pivots including a first pivot 208 about which first link 206 and a second link 210 rotate, and a second pivot 212 about which a third link 214 and a fourth link 216 rotate. First, second, third, and fourth links 206, 210, 214, and 216 are commonly coupled to one another to form linkage 204 as a contiguous member. At an end opposite actuator 202, linkage 204 is coupled at fourth link 216 to a wastegate valve 218, which may be positioned at a fully open position, a fully closed position, or anywhere therebetween relative to a valve seat 220. Valve seat 220 is shown as being disposed in a portion of an exhaust passage 222, which may be exhaust passage 48 of engine 10 in FIG. 1, for example. By positioning wastegate valve 218 in this continuously variable manner, the amount of exhaust gas reaching a turbine (e.g., turbine 62 of FIG. 1) of a turbocharger may be controlled. In this way, the boost pressure delivered to an engine such as engine 10 of FIG. 1 may be controlled according to desired boost and other operating conditions. The position of wastegate valve 218 of wastegate 200 may be particularly controlled via actuation of actuator 202 and placement of its output shaft 201, movements of which may be translated to the exhaust valve via linkage 204.

As shown, wastegate 200 further includes a position sensor 224 that may be configured to measure changes in the angle of output shaft 201 to thereby estimate the location of wastegate valve 218. In some examples, a rotary encoder configured to sense rotation of a rotating component in actuator 202 may be employed, with pulses generated therefrom sent to controller 12 in FIG. 1. Position sensor 224 may be adapted for embodiments in which a linear rod linkage is used in lieu of the four-bar configuration shown in FIG. 2, however. In any case, a measurement by position sensor 224 may be used to determine the position of wastegate valve 218, particularly the distance from the top surface of valve seat 220 to the bottom surface of wastegate valve 218. In other embodiments, however, the position of wastegate valve 218 may be determined based on a soft model using one or more of the signals (e.g., BOOST) described above with reference to FIG. 1 and sent to controller 12.

It will be appreciated that wastegate 200 and various components thereof may be modified without departing from the scope of this disclosure. For example, a current sensor and/or a force sensor may be included with actuator 202, in lieu of or in addition to position sensor 224. Current sensing may be facilitated via a sensor or probe, or in other examples may be calculated based on Ohm's law (or other relation) as the ratio of actuator voltage (e.g., terminal voltage) and actuator resistance (e.g., winding resistance), if these two quantities are known or can be measured or inferred. Further, as described above, other types of linkages may be provided to couple actuator 202 with wastegate valve 218, including but not limited to a linear rod. Moreover, a bias (not shown) may be coupled to wastegate valve 218 to position the valve in a default position when the valve is not actuated by actuator 202.

During certain operating conditions, wastegate arrangement 200 may produce NVH. In particular, linkage 204 may produce rattle when actuator 202 is not adjusting the position of wastegate valve 218 and an associated engine (e.g., engine 10 of FIG. 1) is running idle. This rattle may be a result of mechanical oscillation of relatively loose components of linkage 204, for example. Other factors may contribute to rattle. For example, bimodal nonlinear contact events in which wastegate valve 218 makes contact with its end stop (valve seat 220) may produce rattle. To mitigate rattle generated by linkage 204, and/or other types of NVH produced by wastegate arrangement 200, a waveform may be overlaid on a control signal sent to wastegate actuator 202. The control signal may be one of a plurality of control signals regularly sent to wastegate actuator 202 to position wastegate valve 218 at locations that provide a desired boost level. As such, the control signals may include feedback position control adjustments. A frequency of the overlaid waveform may be computed based on a "rattle frequency"—that is, a frequency at which rattle is produced by wastegate arrangement 200. The rattle frequency may be defined as periods between contact events (e.g., the duration between successive times at which wastegate valve 218 makes contact with valve seat 220). As such, contact events may be detected in some examples by monitoring output from position sensor 224, or in other examples, by monitoring desired boost. In particular, a frequency of the overlaid waveform (referred to herein as "overlay frequency") may be computed as a constant multiplied by the rattle frequency. The constant may be an approximate inverse or non-inverse ratio of Fibonacci numbers—e.g., 2/3 or 3/2. In this example, the overlay frequency may thus be non-harmonic with respect to the rattle frequency, but relatively near the rattle frequency (e.g., within 50 Hz). In some embodiments, control signals sent to wastegate actuator 202 may be modified with the overlay waveform for a certain range of lifts of wastegate valve 218, and not modified with the waveform for lifts outside of the range. FIG. 2 illustrates an exemplary range 226 of valve lifts that may be assumed by wastegate valve 218, including fully closed and open positions, as well as a subset 228 of the range. The overlay waveform may be applied to wastegate actuator control signals for valve lifts falling within subset 228, for example. Generally, subset 228 includes valve lifts proximate, but not corresponding to, valve seat 220. As a non-limiting example, subset 228 includes lifts ranging from 70% of minimum lift (where minimum lift corresponds to the fully closed position) to 90% of minimum lift. It will be appreciated, however, that range 226 and subset 228 are provided as examples and are not intended to be limiting in any way.

As with its frequency, the shape of the overlay waveform may be selected to maximize mitigation of rattle. FIG. 3 shows an example of a waveform 300 that may be overlaid on control signals sent to a wastegate actuator of a wastegate arrangement to reduce rattle produced by the wastegate arrangement. Waveform 300 may particularly be overlaid on control signals sent to wastegate actuator 202 of FIG. 2, for example. As waveform 300 may be understood as a result of several modifications to a typical sine function, FIG. 3 also shows a sine function 302 in dashed lines for reference. Specifically, waveform 300 may be considered a periodic, repeating, asinusoidal function—that is, not exactly sinusoidal (e.g., not corresponding exactly to sine function 302)—exhibiting relatively more linear increases and decreases from lower to higher values, and from higher to lower values, respectively. For example, waveform 300 exhibits a relatively more linear increase for inputs between 0 and $\pi/2$ than the increase of sine function 302 in this range of inputs. In some examples, one or more portions of waveform 300 may be exactly linear (e.g., one or more of the portions for inputs ranging from 0 to $\pi/2$, from $\pi/2$ to $\pi$, from $\pi$ to $3\pi/2$, and from $3\pi/2$ to $2\pi$). Waveform 300 may also exhibit behavior differing from that of sine function 302 at regions proximate its positive and negative peaks (e.g., at 1 and −1 respectively corresponding to inputs of $\pi/2$ and $3\pi/2$). For example, as indicated at 306, waveform 300 exhibits an altered rate of change with a high degree of linearity at regions centered on its peaks (e.g., 1 and −1). For a given peak, such a region may begin at 90% (e.g., 0.9) of the peak on its left side and end once 90% of the peak is reached again at the right side of the peak. The region may exhibit a positive rate of change from the left 90% peak value to the peak, and a negative rate of change from the peak to the right 90% peak value. As such, waveform 300 may exhibit distinct changes in its rate of change when reaching or falling below 90% peak value and when crossing a peak. Three such locations of change in the rate of change of waveform 300 are evident in the region indicated at 306. It will be appreciated that waveform 300 is provided as an example and is not intended to be limiting in any way. In particular, the frequency of waveform 300 was chosen to facilitate its comparison to sine function 302, and will likely differ from that shown in FIG. 3 upon its determination based on the rattle frequency.

By applying an overlay waveform to control signals sent to a wastegate actuator in this manner, rattle generated by valve-seat contact in a wastegate assembly may be mitigated. Other types of NVH may also be reduced, as application of the overlay waveform may keep a wastegate linkage (e.g., linkage 204 of FIG. 2) in dynamic tension and distort resonant frequencies of various linkage components that may otherwise resonate when undergoing mechanical oscillation, as the mass of a wastegate actuator (e.g., actuator 202 of FIG. 2) may be used to maintain a stiff load on loose elements in the linkage. While application of the overlay waveform may alter the position of a wastegate valve (e.g., valve 218 of FIG. 2) from the position it may otherwise assume without the waveform, the extent of this alteration may be small enough so that boost levels delivered to an engine are not adversely affected (e.g., deviations from desired boost levels are maintained below an acceptable threshold). Further, determination of the overlay waveform may take into account other factors—for example, forces required to counterbalance exhaust flow, NVH produced by components outside of the wastegate assembly such as the engine, engine firing frequency, operating conditions for which linkage rattle is increased or reduced, etc.

Turning now to FIGS. 4A-B, a flowchart illustrating a method 400 of operating a wastegate is shown. Method 400 may be employed to operate wastegate 200 of FIG. 2, for example, and may be stored and/or executed by engine controller 12 of FIG. 1. In one example, a method of controlling a turbocharger via the wastegate may comprise determining a desired boost pressure and an actual boost pressure. The wastegate may be adjusted according to a difference between the desired boost pressure and the actual boost pressure.

At 402 the method includes determining a desired boost according to driver demand and engine operating conditions. The conditions assessed may be directly measured with sensors, such as sensors 112, 118, 120, 122, 123, and 134 for example, and/or the conditions may be estimated from other engine operating conditions. The assessed conditions may include engine coolant temperature, engine oil temperature, mass airflow (MAF), manifold pressure (MAP), boost (for example, BOOST pressure from sensor 123), engine speed, idle speed, barometric pressure, a driver-demanded torque (for example, from a pedal position sensor 134), air temperature, vehicle speed, etc.

Next, at 404, an actual boost pressure is determined. The actual boost may be directly measured from a sensor, such as sensor 123. The measurement may be sent to controller 12 via the BOOST pressure signal and stored in a computer-readable storage medium (e.g., ROM 106, RAM 108, and/or KAM 110 of controller 12 in FIG. 1). In an alternative embodiment, the actual boost pressure may be estimated based on other operating parameters, such as based on MAP and RPM, for example.

Next, at 406, atmospheric pressure is determined. For example, atmospheric pressure may be measured from the MAP sensor at engine start-up, and/or estimated based on operating conditions of the engine, including MAF, MAP, throttle position, etc. The measurement may be sent to the engine controller and stored in the computer readable storage medium. In an alternative embodiment, the atmospheric pressure may be estimated based on other operating parameters.

Next, at 408, a difference between the actual and desired boost is determined. The engine controller may determine the difference, for example. In some examples, the difference may be determined by subtracting the desired boost from the actual boost.

Next, at 410, a wastegate valve lift is determined in order to reduce the difference between the actual and desired boost determined at 408. In some examples, the difference between the actual and desired boost, in addition to the current wastegate valve lift, is fed to a suitable control mechanism configured to determine a wastegate valve lift in order to reduce this difference. For example, the wastegate valve lift may be used as an input to wastegate dynamics. In some wastegate actuators, the wastegate valve lift may be mapped to a wastegate duty cycle, where the duty cycle signal is generated by the controller and sent to the wastegate actuator. Mapping to a wastegate duty cycle may include using lookup tables or calculating the wastegate duty cycle. In some other actuators, the wastegate controller determines the duty cycle based on the difference between the desired and actual wastegate positions. A wastegate control (WGC) signal may include pulse width modulation via the wastegate duty cycle to adjust the wastegate. The wastegate valve lift may be achieved by feed-forward, feedback, and/or other control algorithms, for example.

A compensation term may account for delays of the wastegate actuator. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

Next, at 412, a desired actuator position is determined to achieve the wastegate valve lift determined at 410. The desired actuator position may be fed as an input to various suitable control mechanisms including those described above. In some embodiments, a desired actuator orientation may be alternatively determined, such as the rotational orientation of a rotating component in the actuator.

Turning now to FIG. 4B, method 400 continues to 414 where it is determined whether operating conditions for which rattle in a wastegate linkage may be mitigated are met. The operating conditions may include a range of wastegate valve lifts for which rattle mitigation may be performed. The range may include lifts relatively close to, but not corresponding to, and end stop (e.g., valve seat) that may be reached when the wastegate valve is placed at a fully closed position—e.g., subset 228 of FIG. 2. Other conditions may be assessed at 414. For example, conditions conducive to the generation of other types of NVH, inside or outside the wastegate assembly, may prompt waveform overlay described below. Other conditions may include engine speed and a measured or estimated temperature of the wastegate assembly (or a portion thereof), as both may affect the generation of rattle and NVH; in particular, the wastegate assembly temperature may be considered, as temperature variation may alter the length of the wastegate linkage and thus the proximity of the wastegate valve to its end stop. If it is determined that the rattle conditions are not met (NO), the method proceeds to 422. If it is determined that the rattle conditions are met (YES), the method proceeds to 416.

At 416, the rattle frequency is determined. As described above, the rattle frequency may be defined as the period of time separating successive contact events (times at which the wastegate valve makes contact with its end stop). In some examples, the rattle frequency may be updated upon detection of a new contact event. Contact events may be detected by monitoring output from a wastegate position sensor (e.g., sensor 224), by monitoring desired boost, or by reading output from a suitable sensor (e.g., piezoelectric sensor configured to sense vibration in the wastegate assembly), for example.

Next, at 418, an overlay frequency of a waveform to be overlaid on the WGC is determined. As described above, the overlay frequency may be determined as a product of a constant and the rattle frequency determined at 416, where the constant may be an approximate inverse or non-inverse ratio of Fibonacci numbers (e.g., 2/3 or 3/2). In this example, the overlay frequency may thus be non-harmonic with respect to the rattle frequency, but relatively near the rattle frequency. In some examples, the overlay frequency may further be determined based on other conditions assessed at 414; for example, the overlay frequency may be determined in an attempt to mitigate linkage rattle due to resonance of linkage components. As such, the overlay frequency may differ from known resonant frequencies of various linkage components that generate NVH.

Next, at 420, the waveform is overlaid on the WGC. The waveform may be an asinusoidal function exhibiting relatively more linear rates of change than a typical sine function, such as waveform 300 of FIG. 3. The waveform assumes the overlay frequency determined at 418 so that NVH in the wastegate linkage (and optionally NVH generated by other components) may be reduced.

Next, at 422, the WGC is applied to the actuator to achieve the desired actuator position determined at 412. As described above, the WGC may include pulse width modulation via the wastegate duty cycle to adjust the wastegate. If the rattle conditions were met at 414, the WGC includes the overlay waveform, while, if the rattle conditions were not met at 414, the WGC does not incorporate the waveform.

Next, at 424, it is determined whether the actuator position is at the desired actuator position. Here, the sensed actuator position may be compared to the desired actuator position. In some embodiments, differences between the corrected actuator position and desired actuator position below a threshold may be ignored. If the actuator position is not at the desired actuator position (NO), the method returns to 424. If the actuator position is at the desired actuator position (YES), the method proceeds to 426.

At 426, the control signal applied to the actuator is adjusted to maintain the desired valve lift and control the actuator position. The desired valve lift may be maintained via feedback and/or feed-forward control algorithms. For example, valve lift may be controlled via an inner control loop. Thus, the control signal is adjusted when the corrected actuator position reaches a position corresponding to a desired wastegate valve position. It will be appreciated that adjustment of the control signal at 426 may include applying one or more overlay waveforms in the manners described above, if the rattle conditions assessed at 414 are met throughout adjustment of the control signal. In some examples, one or more new waveforms may be determined throughout adjustment, for example in response to a change in the rattle frequency. Following 426, the method ends.

Method 400 may include other steps not shown in FIGS. 4A-B. For example, degradation of the wastegate actuator may be indicated responsive to detection of rattle while applying the non-harmonic oscillation adjustments via the overlay waveform. Indication of wastegate actuator degradation may include setting diagnostic codes and/or notifying a vehicle operator via dashboard indicators, for example.

FIG. 5 shows an exemplary map 500 illustrating the lift of a wastegate valve (e.g., valve 218 of FIG. 2) for an exemplary drive cycle. The wastegate valve lift spans a range of positions between a fully open position (labeled "FO" in FIG. 5), and a fully closed position (labeled "FC" in FIG. 5), and are shown as a function of time. At the start of the drive cycle, the wastegate valve lift initially corresponds to the fully closed position. As such, the valve may be placed against its end stop. The valve lift then undergoes a decrease followed by an increase until reaching the fully closed position, indicated at 502, followed by a decrease, until reaching the fully closed position once more as indicated at 504. The correspondences to the fully closed position indicated at 502 and 504 each constitute a contact event. As such, a rattle frequency may be determined based on these contact events, and subsequently, an overlay frequency and overlay waveform that may be overlaid on wastegate control signals should rattle conditions be satisfied, according to method 400 of FIGS. 4A-B. Following the contact events indicated at 502 and 504, the rattle conditions are satisfied throughout a duration 506 (indicated in FIG. 5 via shading)—specifically, the valve lift falls within a range of lifts for which rattle mitigation may be performed, among potentially other conditions. Accordingly, one or more overlay waveforms are overlaid on wastegate control signals sent throughout duration 506 to mitigate rattle (potentially in addition to other types of NVH). Following duration 506, the rattle conditions are no longer satisfied, and wastegate control signals sent outside the duration are no longer overlaid with the overlay waveform.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of adjusting a linked valve actuator system, comprising:
calculating a feedback position control adjustment based on a difference between an actual position and a desired position of an actuator of the linked valve actuator system;
applying a combined signal of the feedback position control adjustment and a non-harmonic oscillation to the actuator so that the actuator moves to the desired position with a reduction in noise, vibration, and harshness, wherein the non-harmonic oscillation is a repeating non-harmonic oscillation applied for only a subset of wastegate valve lifts proximate, but not corresponding to, a valve seat of the linked valve actuator system.

2. The method of claim 1, wherein the non-harmonic oscillation is asinusoidal.

3. The method of claim 1, wherein the non-harmonic oscillation is periodic and has an overlay frequency determined based on a rattle frequency.

4. The method of claim 3, wherein the rattle frequency is a period between successive times at which a wastegate valve of the linked valve actuator system makes contact with the valve seat of the linked valve actuator system.

5. The method of claim 4, wherein contact with the valve seat is detected by monitoring output from a position sensor of the actuator.

6. The method of claim 4, wherein the non-harmonic oscillation is non-harmonic with respect to the rattle frequency.

7. The method of claim 3, wherein the overlay frequency is further determined based on a constant multiplied by the rattle frequency, the constant being ratio of Fibonacci numbers.

8. The method of claim 7, wherein the ratio is one of 2/3 and 3/2.

9. A method of operating a wastegate of an engine, comprising:
generating an asinusoidal waveform based on noise, vibration, and harshness conditions in the wastegate;

calculating wastegate actuator control signals to produce a desired engine boost;

overlaying the asinusoidal waveform on the control signals and sending the control signals with the overlaid asinusoidal waveform to a wastegate actuator to control the wastegate to a desired position with reduced noise, vibration, and harshness.

10. The method of claim 9, wherein the asinusoidal waveform is overlaid on the control signals for wastegate valve lifts proximate, but not corresponding to, a valve seat of a linked valve actuator system.

11. The method of claim 9, wherein the noise, vibration, and harshness conditions include a rattle frequency corresponding to a period between successive times at which a wastegate valve makes contact with a valve seat, and
wherein the asinusoidal waveform is periodic, the waveform having an overlay frequency determined based on the rattle frequency.

12. The method of claim 11, wherein the overlay frequency is a product of a ratio of Fibonacci numbers and the rattle frequency.

13. The method of claim 11, wherein the overlay frequency is non-harmonic with respect to the rattle frequency.

14. The method of claim 9, wherein the calculation of the control signals to produce the desired engine boost is based on engine operating conditions.

15. A method of adjusting a linked turbocharger wastegate valve actuator system, comprising:

applying feedback position control adjustments to a wastegate via the linked turbocharger wastegate valve actuator system to position the wastegate at a desired wastegate position determined as a function of engine operating conditions; and adding a repeating non-harmonic oscillation adjustment to the wastegate via the linked turbocharger wastegate valve actuator system, where the repeating non-harmonic oscillation is applied to only a subset of wastegate valve lifts that are proximate, but not corresponding to, a valve seat of the linked turbocharger wastegate valve actuator system.

16. The method of claim 15 further comprising indicating degradation of the linked turbocharger wastegate valve actuator system responsive to detection of rattle while applying the non-harmonic oscillation adjustment.

17. The method of claim 16, wherein the non-harmonic oscillation is asinusoidal, and wherein the non-harmonic oscillation is periodic and has an overlay frequency determined based on a rattle frequency.

18. The method of claim 17, wherein contact with the valve seat generating the detected rattle is determined by monitoring output from a position sensor of the linked turbocharger wastegate valve actuator system.

* * * * *